US012709976B1

(12) United States Patent
Katayama et al.

(10) Patent No.: US 12,709,976 B1
(45) Date of Patent: Aug. 18, 2026

(54) FUSION OF WELLBORE SURVEYS AND RANGING MEASUREMENTS

(71) Applicant: Schlumberger Technology Corporation, Sugar Land, TX (US)

(72) Inventors: Makito Katayama, Clamart (FR); Mahmoud ElGizawy, Bucharest (RO); Ross Lowdon, Stonehouse (GB); Alexandre de Saint Germain, Stonehouse (GB)

(73) Assignee: Schlumberger Technology Corporation, Sugar Land, TX (US)

(*) Notice: Subject to any disclaimer, the term of this patent is extended or adjusted under 35 U.S.C. 154(b) by 0 days.

(21) Appl. No.: 19/277,826

(22) Filed: Jul. 23, 2025

(51) Int. Cl.
*E21B 47/0224* (2012.01)
*G01V 1/30* (2006.01)

(52) U.S. Cl.
CPC .......... *E21B 47/0224* (2020.05); *G01V 1/301* (2013.01)

(58) Field of Classification Search
CPC ........ E21B 47/022; E21B 44/00; E21B 47/00; E21B 47/02; G01V 1/301
See application file for complete search history.

(56) References Cited

U.S. PATENT DOCUMENTS 5,435,069 A * 7/1995 Nicholson ............. E21B 47/022 702/9
5,589,775 A * 12/1996 Kuckes ............... E21B 47/0228 175/45
9,932,818 B2 * 4/2018 Hay ...................... E21B 47/022
12,104,480 B2 * 10/2024 Wiecek ................... E21B 49/00
2003/0014873 A1 * 1/2003 Towle ....................... E21B 7/06 33/304
2007/0168133 A1 * 7/2007 Bennett ................... E21B 49/00 702/6
2014/0374159 A1 * 12/2014 McElhinney ....... E21B 47/0228 175/45
2019/0257189 A1 * 8/2019 Bang ....................... E21B 47/09
2022/0003106 A1 * 1/2022 Benson ................... E21B 45/00
2023/0069702 A1 * 3/2023 Benson ................... F24T 10/20
2023/0151696 A1 * 5/2023 Weideman .............. E21B 7/046 175/27
2023/0243214 A1 * 8/2023 Mitkus ...................... E21B 7/04 175/24
2025/0129670 A1 * 4/2025 Jamieson ................ E21B 44/00
2025/0258312 A1 * 8/2025 Wu .......................... G01V 3/30

(Continued)

FOREIGN PATENT DOCUMENTS

CA 2930384 C * 4/2020 ........... G05B 19/406

OTHER PUBLICATIONS

Williamson, H.S., "Accuracy Prediction for Directional Measurement While Drilling", SPE Drill. Completion, SPE-67616-PA, Dec. 2000, pp. 221-233, vol. 15, No. 4.

*Primary Examiner* — Daniel P Stephenson
(74) *Attorney, Agent, or Firm* — Jeffrey D. Frantz

(57) ABSTRACT

Improved wellbore trajectories are determined via fusing wellbore surveys and ranging measurements. A probability function is optimized to compute the improved trajectories having improved positional uncertainties. The probability function is defined such that it includes trajectories of first and second wellbores, corresponding positional uncertainties of the first and second wellbores, ranging measurements between the first and second wellbores, and a ranging uncertainty.

20 Claims, 6 Drawing Sheets

(56) References Cited

U.S. PATENT DOCUMENTS

| | | | | |
|---|---|---|---|---|
| 2025/0264019 | A1* | 8/2025 | Lowdon | E21B 7/06 |
| 2025/0361779 | A1* | 11/2025 | Lau | E21B 21/003 |
| 2025/0376922 | A1* | 12/2025 | Richards | E21B 47/0228 |

* cited by examiner

FUSION OF WELLBORE SURVEYS AND RANGING MEASUREMENTS

FIELD

Disclosed embodiments relate generally to wellbore surveying methods and more particularly to methods for fusing wellbore surveys with ranging measurements to obtain improved wellbore trajectories.

BACKGROUND

Wellbore attitude (inclination and azimuth) measurements are commonly made during a drilling operation while drilling. Such survey measurements are commonly assembled into a survey of the well and used to calculate a three-dimensional trajectory (a well path) using the minimum curvature or another curvature assumption. Errors (e.g., random error or bias errors) in the individual survey measurements result in a wellbore trajectory uncertainty that generally increases with measured depth. In deep wells the uncertainty (or error) in the wellbore position (the positional uncertainty) is often significant.

In subterranean drilling operations the need frequently arises to determine the relative location of a wellbore being drilled (the drilling well) with respect to a pre-existing offset wellbore (a target well) or some other subterranean structure (in part owing to the large positional uncertainty of the survey derived trajectories). This need may exist, for example, for the purpose of avoiding a collision, for the purpose of making an interception, or for the purpose of maintaining a specified separation distance between the wells (e.g., as in well twinning operations). Various ranging techniques are used in the industry to measure the relative location of the target well (or structure), with respect to the drilling well. Such ranging techniques including, for example, magnetic ranging, acoustic ranging, and resistivity ranging techniques. The ranging measurements may provide an absolute distance (a scalar) between the two wells or a distance and direction (a vector) between the two wells. Moreover, ranging accuracy tends to improve as the two wells approach one another (or otherwise become closer to one another).

While wellbore surveying measurements and ranging measurements are established downhole measurement techniques for determining the absolute and relative positions of a wellbore, there remains a need in the industry for improved utilization of surveying and ranging measurements, particularly for improving trajectory accuracy (reducing positional uncertainty).

SUMMARY

Systems and methods for determining improved wellbore trajectories are disclosed. One example disclosed method includes obtaining first and second wellbore trajectories for first and second corresponding wellbores and first and second positional uncertainties for the first and second wellbore trajectories. A set of ranging measurements and a corresponding ranging uncertainty are obtained in which the ranging measurements include at least a distance between the first and second wellbores. A probability function is defined that includes the first and second wellbore trajectories, the first and second positional uncertainties, the ranging measurements, and the ranging uncertainty. The probability function determines a probability of observing the obtained first and second wellbore trajectories and the obtained ranging measurements for various actual first and second wellbore trajectories. The probability function is optimized to compute an improved wellbore trajectory of at least one of the first and second wellbores wherein the improved wellbore trajectory has an improved positional uncertainty.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

For a more complete understanding of the disclosed subject matter, and advantages thereof, reference is now made to the following descriptions taken in conjunction with the accompanying drawings, in which:

FIGS. 5A, 5B, 5C, and 5D (collectively FIG. 5) depict example wellbore trajectories that illustrate the disclosed embodiments in which FIG. 5A depicts an isometric (or path) view and FIGS. 5B, 5C, and 5D depict well plans (or horizontal profiles) of the wellbore trajectories.

DETAILED DESCRIPTION

A disclosed method includes optimizing a probability function to compute an improved wellbore trajectory of at least one of first and second wellbores wherein the improved wellbore trajectory has an improved positional uncertainty. The probability function is defined such that it includes trajectories of the first and second wellbores, corresponding positional uncertainties of the first and second wellbores, ranging measurements between the first and second wellbores, and a ranging uncertainty. The probability function determines a probability of observing the obtained first and second wellbore trajectories and the obtained ranging measurements for various actual first and second wellbore trajectories.

Example embodiments disclosed herein may provide various technical advantages and improvements over the prior art. For example, the disclosed embodiments may provide for improved well trajectories for both the drilling well and the target well with improved ellipses or rectangles of uncertainty. Moreover, the disclosed embodiments may be advantageously used in real time while drilling and surveying the drilling well to improve wellbore intercept, avoidance, or twinning operations.

Figure 1:
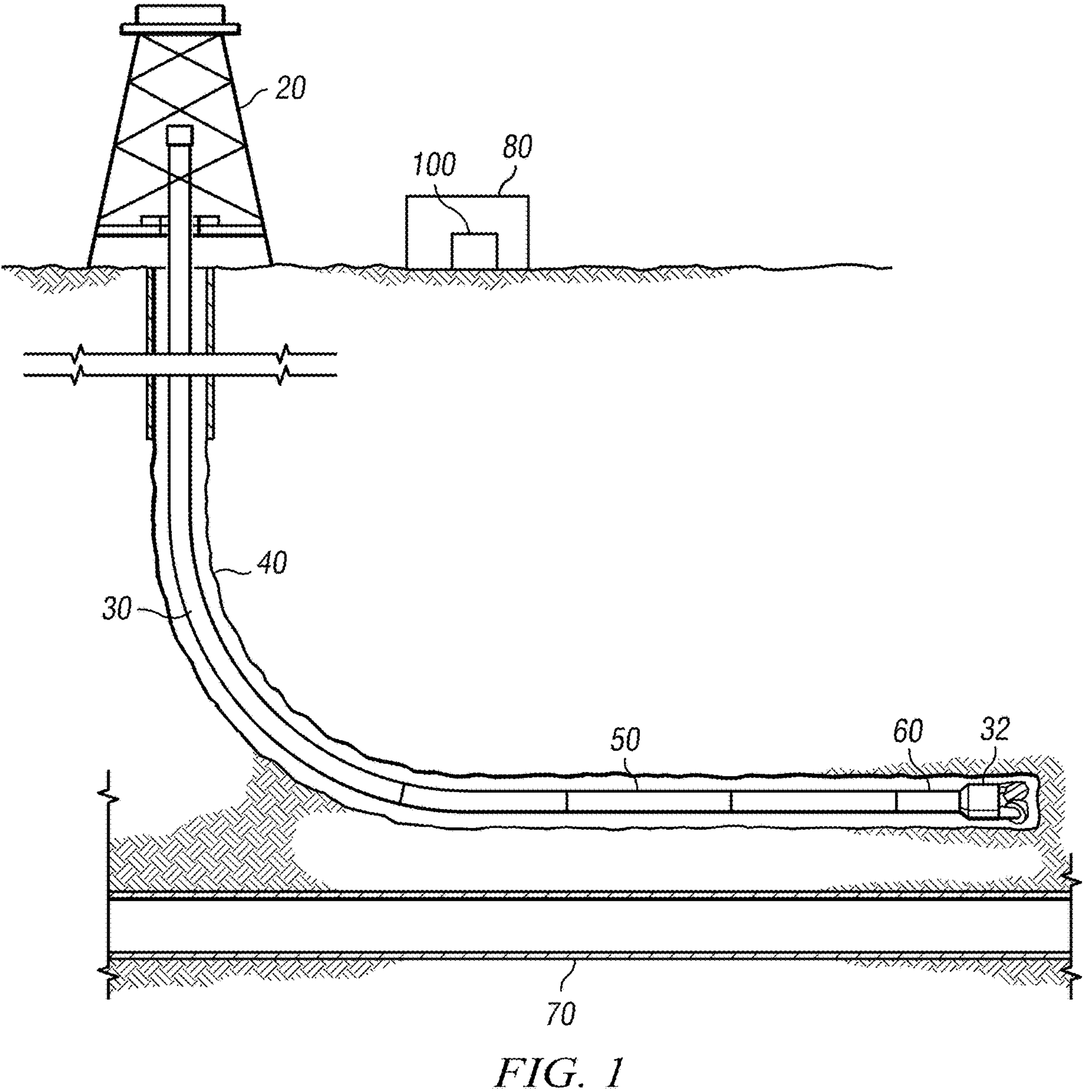
FIG. 1 depicts a drilling rig including a disclosed surveying system.

FIG. 1 depicts a drilling rig 20 including a disclosed surveying system 100. The system 100 may be configured to receive survey measurements from a downhole surveying tool (e.g., including a measurement while drilling tool 50 or a rotary steerable system 60). In the depicted embodiment, the drilling rig 20 is positioned over a subterranean formation and may include a derrick and a hoisting apparatus (not shown) for raising and lowering a drill string 30, which, as shown, extends into wellbore 40 and includes a drill bit 32 and a surveying tool, such as a measurement while drilling (MWD) tool 50 and/or a rotary steerable system (RSS) 60. As is known to those of ordinary skill in the art, the drill string 30 may further include other tools such as a downhole drilling motor, a downhole telemetry system (e.g., deployed in or adjacent to MWD tool 50), and one or more logging while drilling (LWD) tools including various sensors for sensing downhole characteristics of the wellbore and the surrounding formation. The disclosed embodiments are expressly not limited in regards to the bottom hole assembly (BHA) configuration.

It will be understood by those of ordinary skill in the art that the deployment illustrated on FIG. 1 is merely an example. It will be further understood that disclosed embodiments are not limited to an onshore deployment as depicted. The drilling rig 20 may be deployed onshore or offshore. As is further known to those of ordinary skill, offshore rigs commonly include a platform deployed atop a riser that extends from the sea floor to the surface. The drill string extends downward from the platform, through the riser, and into the wellbore through a blowout preventer (BOP) located on the sea floor. The disclosed embodiments are expressly not limited in these regards.

With continued reference to FIG. 1, it will be appreciated that wellbore surveying measurements are commonly made while drilling a wellbore using a surveying tool deployed in the BHA. The surveying measurements generally include triaxial accelerometer measurements and triaxial magnetometer measurements and sometimes further include gyroscope measurements (e.g., in addition to or instead of the magnetometer measurements). The surveying measurements are commonly processed to determine a wellbore attitude (a wellbore heading) including a wellbore inclination and a wellbore azimuth. Static survey measurements have long been made at a discrete number of longitudinal points along the axis of the wellbore when drilling has temporarily stopped and the drill string has been lifted off the bottom of the wellbore. More recently, methods have been developed to make continuous (dynamic) survey measurements in real time while drilling. The disclosed embodiments may make use of wellbore surveying including static and/or dynamic survey measurements.

The wellbore survey measurements may be assembled into a survey of the wellbore to calculate (integrate) a three-dimensional well path (or trajectory) using the minimum curvature or another wellbore curvature assumption. An ellipse of uncertainty (EOU) defines the positional uncertainty of the calculated trajectory and may be computed along the length of the wellbore from known or modelled surveying measurement errors. These errors tend to compound (or sum) with increasing depth such that the EOU increases with increasing depth (the wellbore position becomes less certain with increasing depth).

With further reference to the example depiction in FIG. 1, wellbore 40 is shown as being drilled in proximity to a section of a previously drilled wellbore 70. It will be appreciated by those of ordinary skill in the art that ranging measurements are commonly made when drilling one well (e.g., wellbore 40) in close proximity to another well (e.g., wellbore 70). Various ranging methodologies are known in the industry, for example, including active and passive magnetic ranging methods, acoustic ranging methods, and resistivity based ranging methods. The ranging measurements are intended to determine a relative position of the drilling wellbore with respect to the previously drilled wellbore (or the previously drilled wellbore with respect to the drilling wellbore). As is known in the industry, measuring the relative position between the two wells may be important in certain drilling operations such as wellbore intercept, wellbore avoidance, and wellbore twinning operations.

As noted above, the rig 20 may include a system 100 configured to combine wellbore surveying measurements and ranging measurements to determine improved wellbore trajectories. The system 100 may be deployed at the rig site (e.g., in an onsite laboratory or office facility 80 as depicted in FIG. 1) or offsite (e.g., accessible via a networked internet connection). The disclosed embodiments are not limited in this regard. The system 100 may include computer hardware and software (e.g., a laptop or desktop personal computer) configured to receive the wellbore survey and ranging measurements and to determine the improved wellbore trajectories. In such embodiments, the controller system 100 may include processor executable instructions stored in memory to execute selected ones of the method steps described in more detail below with respect to FIGS. 3-6. To perform these functions, the hardware may include one or more processors (e.g., microprocessors) which may be connected to one or more data storage devices (e.g., hard drives or solid state memory). As is known to those of ordinary skill, the processors may be further connected to a network, e.g., to receive the surveying and ranging measurements or another computer system. It will, of course, be understood that the disclosed embodiments are not limited to the use of or the configuration of any particular computer hardware and/or software.

Figures 2, 3:
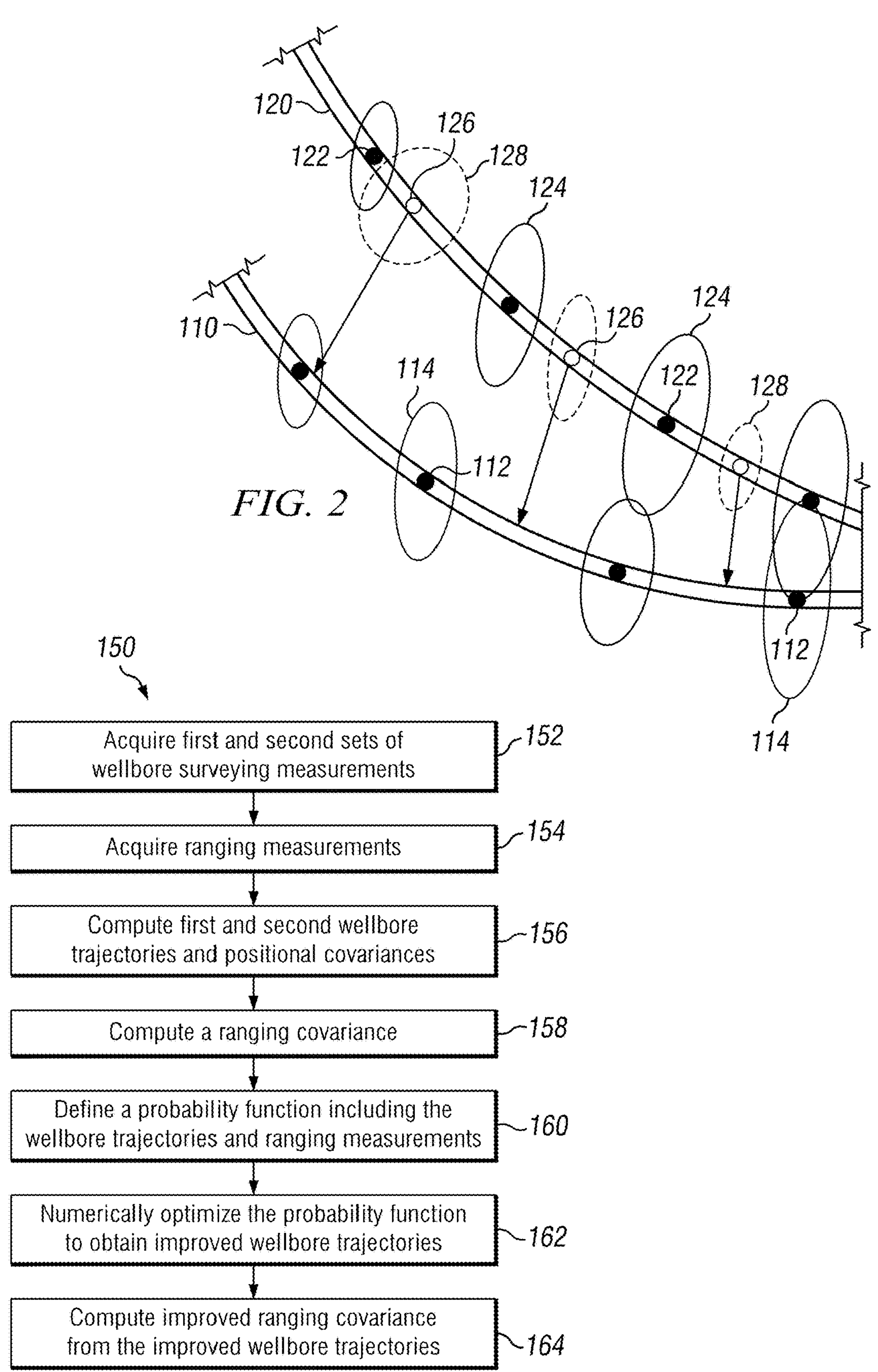
FIG. 2 schematically depicts first and second wellbores and corresponding surveying and ranging measurements.
FIG. 3 depicts a flow diagram of an example method of fusing surveying and ranging measurements to obtain an improved wellbore trajectory.

FIG. 2 schematically depicts first and second wellbores 110 and 120. In the depicted schematic wellbore 120 is approaching wellbore 110 from above in an example wellbore intercept operation (although the disclosed embodiments are of course not limited in these regards and may also include wellbore avoidance and wellbore twinning operations). Wellbore survey measurements 112 and 122 are shown as dark circles in the well trajectory with EOUs 114 and 124 shown about each survey measurement. Note that the EOUs 114 and 124 increase in size with increasing measured depth (from left to right in the figure) indicating increasing positional uncertainty with increasing depth.

FIG. 2 further depicts ranging measurements 126 (shown as open circles) made in the first wellbore 110. The ranging measurements measure a scalar distance or a vector distance (a distance and a direction) between the first wellbore 110 and the second wellbore 120. Various ranging methodologies are known in the industry, for example, including active and passive magnetic ranging methods, acoustic ranging methods, and resistivity based ranging methods. The disclosed embodiments are not limited to any particular ranging methodology and may make use of multiple types of ranging measurements. The ranging measurements 126 are also subject to error (both random and systematic) that can result in uncertainties in both the distance and direction to the target well. These uncertainties are depicted as dashed ellipses 128. Note that the ellipses decrease in size as the drilling well 110 approaches the target well 120 (from left to right in the figure) indicating decreasing positional uncertainty (increasing certainty) as distance between the two wells decreases.

FIG. 3 depicts a flow diagram of an example method 150 of fusing surveying and ranging measurements to obtain an improved wellbore trajectory. Wellbore surveying measurements are acquired at 152 for each of first and second subterranean wellbores. In example embodiments the first and second wellbore surveys may be historical surveys for completed wellbores. In other example embodiments, the first wellbore survey may be a historical survey for a completed wellbore and the second wellbore survey may include partial survey results for an ongoing wellbore drilling operation. The disclosed embodiments are not limited in this regard. Ranging measurements are received at 154. The ranging measurements may be made in either of the first or second wellbore and measure a distance (a scalar quantity) between the first and second wellbores or a distance and a direction (a vector quantity) between the first and second wellbores. The ranging measurements may include substantially any suitable ranging measurements, such as acoustic ranging measurements, active magnetic ranging measurements, passive magnetic ranging measurements, and the like.

Wellbore trajectories and position covariance (positional uncertainties) are computed for first and second wellbores from the received first and second wellbore surveys and corresponding survey error models at 156. A ranging measurement covariance is computed from the received ranging measurements and a ranging error model at 158. A probability function is defined at 160 that includes both the surveying measurements and the ranging measurements (received at 152 and 154) as well as the corresponding wellbore trajectories and covariances (computed at 156 and 158). The probability function is numerically optimized at 162 to estimate improved first and second wellbore trajectories (e.g., the most probable or likely trajectories) and corresponding improved positional covariances. An improved ranging covariance is computed (or recomputed) based on the improved trajectories and positional covariances at 164.

Figure 4A:
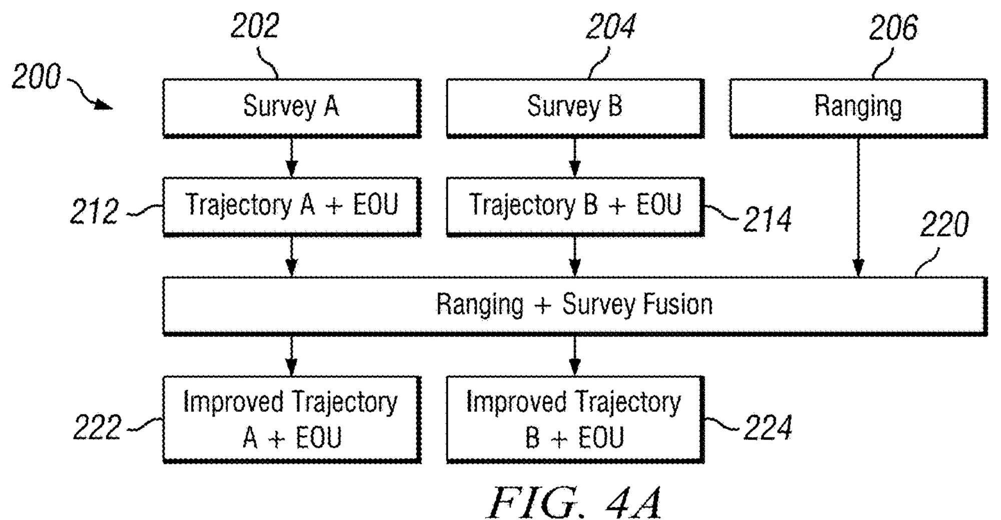
FIGS. 4A-4C (collectively FIG. 4) depict flow diagrams of other example methods of fusing surveying and ranging measurements to obtain an improved wellbore trajectory.
Figure 4B:
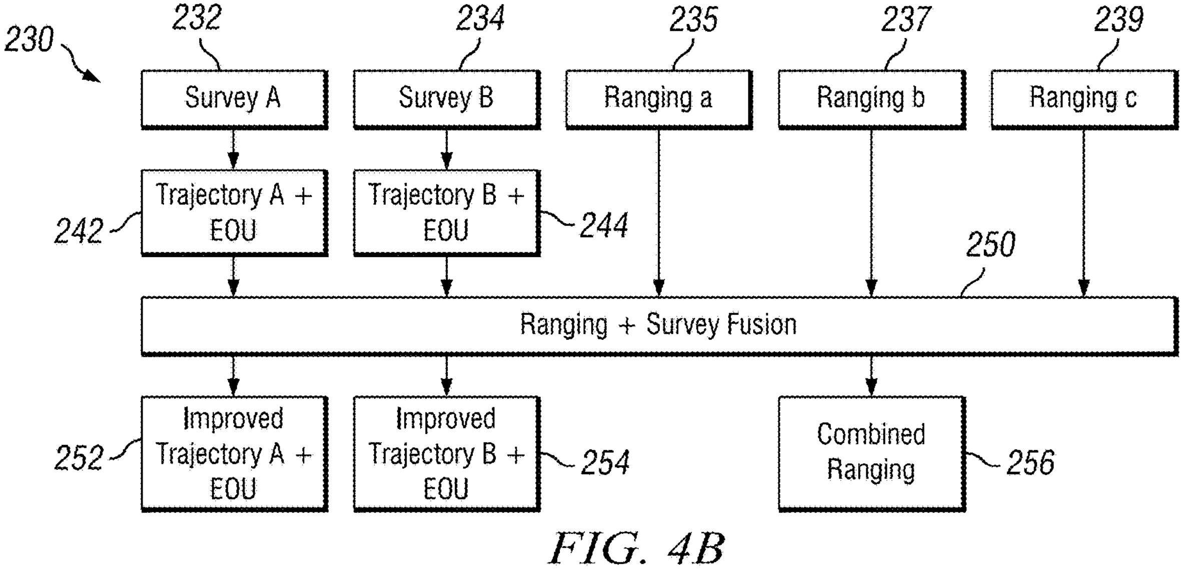
Figure 4C:
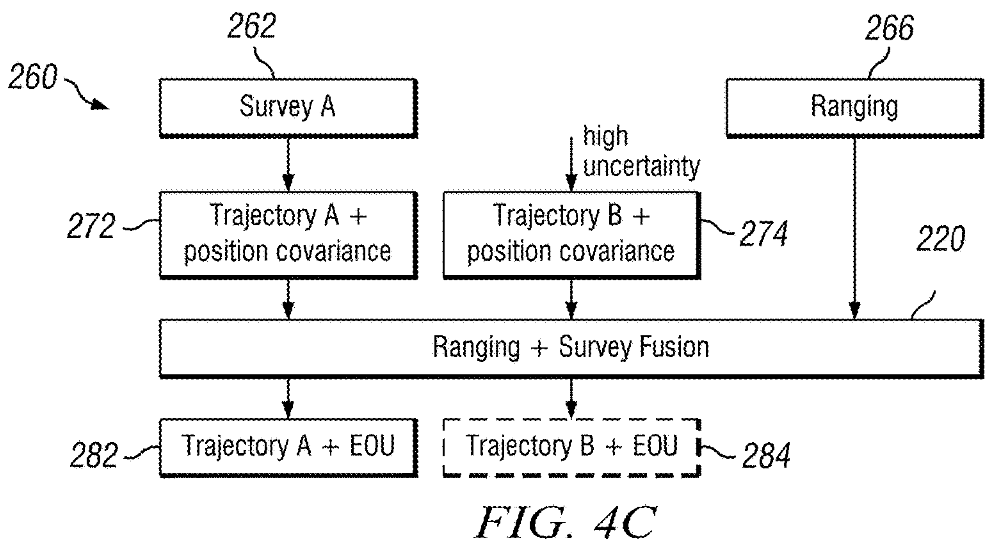

FIGS. 4A, 4B, and 4C (collectively FIG. 4) depict flow diagrams for example methods of fusing surveying and ranging measurements to obtain an improved wellbore trajectory. In FIG. 4A method 200 includes receiving wellbore surveys for first and second wellbores at 202 and 204 as well as ranging measurements at 206. The method may further include receiving and/or computing trajectories, including corresponding EOUs, of the first and second wellbores at 212 and 214. In the depicted embodiment, the first and second trajectories are computed directly from the first and second surveys. The first and second trajectories and the ranging measurements are fused at 220 to compute new improved trajectories 222 and 224, including new EOUs, for the first and second wellbores. Example fusion techniques are described in more detail below.

In FIG. 4B, method 230 is similar to method 200 in that it includes receiving wellbore surveys for first and second wellbores at 232 and 234. Multiple unique sets of ranging measurements are received (or made) as shown at 235, 237, and 239. These unique sets of ranging measurements may be made using distinct ranging measurement techniques, for example, magnetic, electromagnetic, and acoustic ranging techniques. Wellbore trajectories, including corresponding EOUs, are received and/or computed for the first and second wellbores at 242 and 244. The first and second trajectories and the multiple sets of ranging measurements are fused at 250 to compute new trajectories 252 and 254, including new EOUs, for the first and second wellbores and a combined set of ranging measurements 256. Example fusion techniques are described in more detail below.

In FIG. 4C, method 260 may be used to estimate the trajectory of a second wellbore having an unknown trajectory or a very high uncertainty. In the depicted example, a wellbore survey is received for a first wellbore at 262. Ranging measurements are received at 266. A wellbore trajectory, including a corresponding EOU, is received and/or computed for the first wellbore at 272. A hypothetical (highly uncertain) second trajectory is assumed for the second wellbore at 274. The first and second trajectories and the ranging measurements are fused at 220 to compute a trajectory 284, including an EOU, of the second wellbore. The trajectory of the first wellbore 282 may remain largely the same as that computed at 272. Example fusion techniques are described in more detail below.

With continued reference to FIGS. 3 and 4, first and second wellbore surveys or trajectories may be expressed mathematically, for example, as follows:

$$x^{(1)} \sim \mathcal{N}\left(\hat{x^{(1)}}, C^{(1)}\right)$$

$$x^{(2)} \sim \mathcal{N}\left(\hat{x^{(2)}}, C^{(2)}\right)$$

where $\mathcal{N}(\cdot)$ indicates a normal distribution, $x^{(s)}$ represent observed (measured) positions for the $s_{th}$ survey tool, for example, first and second survey tools in corresponding first and second wellbores, $\widehat{x^{(s)}}$ represent the true (ground truth) positions for the $s_{th}$ survey tool, and $C^{(s)}$ represents the covariance of the position errors for the first and second wellbores. The observed positions $x^{(s)}$ may be given as a vector of positions computed at corresponding survey measurement locations, for example, as follows:

$$x^{(s)} = \begin{pmatrix} x_1^{(s)} \\ \vdots \\ x_n^{(s)} \end{pmatrix}$$

where each component $$x_k^{(s)}$$

of $x^{(s)}$ represent a position in a 3D coordinate system, such as the global north-east-down (NED) coordinate system. For example:

$$x_k^{(s)} = \begin{bmatrix} N_k \\ E_k \\ D_k \end{bmatrix}$$

The covariance of the position errors $C^{(s)}$ may be expressed as a 3N by 3N matrix, for example, as follows:

$$C^{(s)} = \begin{pmatrix} C_1^{(s)} & C_{1,k}^{(s)} & C_{1,n}^{(s)} \\ & \ddots & \\ C_{k,1}^{(s)} & C_k^{(s)} & C_{k,n}^{(s)} \\ & & \ddots \\ C_{n,1}^{(s)} & C_{n,k}^{(s)} & C_n^{(s)} \end{pmatrix}$$

where covariance between first and second positions $k_1$ and $k_2$ is given as follows (following the notational convention in H. S. Williamson, *Accuracy Prediction for MWD, SPE Drill & Completion* 15(4) 2000):

$$C^{(s)}_{k_1,k_2} = \sum_{\substack{errors \\ i}} \sum_{k_1<K_1} \sum_{k_2<K_2} \rho_{k_1,k_2} e^{(s)}_{i,k_1} e^{(s)^T}_{i,k_2}$$

In the foregoing, $\rho_{k_1,k_2}$ represents the amplitude of the error source, owing for example, to misalignment, bias offset, etc. and $$e^{(s)}_{i,k_1}$$

represents the direction of the error.

Ranging measurements may be expressed as a change or difference between the position of the first and second wellbores, for example, as follows:

$$\Delta x \sim \mathcal{N}(\hat{\Delta x}, c)$$

where Δx represents a vector of the ranging measurements, $\Delta\hat{x}$ represents a vector of the true (ground truth) positional differences between the two wellbores at the ranging measurement locations, and c represents the covariance matrix of the ranging measurements (or ranging errors). As noted above, Δx represents a vector of the ranging measurements and may be given, for example, as follows:

$$\Delta x = \begin{pmatrix} \Delta x_1 \\ \vdots \\ \Delta x_n \end{pmatrix}$$

where $$(\pm)\Delta\hat{x}_k = \Delta\hat{x}^{(1)}_k - \Delta\hat{x}^{(2)}_k$$

It will be appreciated that in certain ranging operations, the ranging measurements do not determine the polarity of the measurements (i.e., the ranging measurements include two opposite signed solutions). To account for such ambiguity, where the measurement polarity is unknown, the foregoing equation lists the measurements as $(\pm)\widehat{\Delta x_k}$ which allows for uncertainty of the assignment of the sign.

A probability function including a joint likelihood function of the measurement in this example embodiment may be defined as follows:

$$\mathcal{L} = P\left(x^{(1)}, x^{(2)}, \Delta x \mid \Delta\hat{x}^{(1)}, \Delta\hat{x}^{(2)}\right)$$

where £ represents the likelihood function, P (•|•) represents a probability density function, and $x^{(s)}$, $\widehat{x^{(s)}}$, and Δx are as given above. It will be appreciated that the likelihood function determines the probability of observing the measured trajectories (or sets of survey data) and the measured ranging data for various true (or actual) trajectories $\widehat{x^{(1)}}$ and $\widehat{x^{(2)}}$. Thought of another way, the likelihood function determines the likelihood of true trajectories $\widehat{x^{(1)}}$ and $\widehat{x^{(2)}}$ given the measured survey and ranging data (as well as corresponding measurement error models). In the foregoing, each set of measurements is independent of one another such that the joint likelihood may be expressed as follows (as the product of the individual likelihood functions):

$$\mathcal{L} = P\left(x^{(1)} \mid x^{\hat{(1)}}\right) P\left(x^{(2)} \mid x^{\hat{(2)}}\right) P\left(\Delta x \mid x^{\hat{(1)}}, x^{\hat{(2)}}\right)$$

Taking the logarithm of the joint likelihood yields:

$$\ln\mathcal{L} = \ln P\left(x^{(1)} \mid x^{\hat{(1)}}\right) + \ln P\left(x^{(2)} \mid x^{\hat{(2)}}\right) + \ln P\left(\Delta x \mid x^{\hat{(1)}}, x^{\hat{(2)}}\right)$$

Assuming that the measurements follow a Gaussian distribution, the log likelihood L may be defined as given below and optimized (solved) using any suitable numeric method (such as least squares, Gauss-Newton method, gradient descent, Levenberg-Marquardt algorithm, conjugate gradient method, and the like):

$$L = -\ln\mathcal{L} = \frac{1}{2}\left(x^{(1)} - x^{\hat{(1)}}\right)^T C^{(1)^{-1}}\left(x^{(1)} - x^{\hat{(1)}}\right) + \frac{1}{2}\left(x^{(2)} - x^{\hat{(2)}}\right)^T C^{(2)^{-1}}\left(x^{(2)} - x^{\hat{(2)}}\right) + \sum_{k=1}^{N}\left(\frac{1}{2}\left(\Delta x_k - x^{\hat{(1)}}_k + x^{\hat{(2)}}_k\right)^T c_i\left(\Delta x_k - x^{\hat{(1)}}_k + x^{\hat{(2)}}_k\right)\right) + \text{const}$$

Note that $L=f(\widehat{x^{(1)}}, \widehat{x^{(2)}})$. By optimized it is meant computing the wellbore trajectories $\widehat{x^{(1)}}$ and $\widehat{x^{(2)}}$ that optimize L (e.g., computing the most likely wellbore trajectories via estimating the optimal solution) from the computed trajectories $x^{(1)}$ and $x^{(2)}$. It will be appreciated that in one example embodiment the optimization may include maximizing £ which is equivalent to minimizing L.

When the polarity of the ranging measurements (i.e., the direction to the target well) is unknown, the following equation may be utilized.

$$L = -\ln\mathcal{L} = \frac{1}{2}\left(x^{(1)} - x^{\hat{(1)}}\right)^T C^{(1)^{-1}}\left(x^{(1)} - x^{\hat{(1)}}\right) + \frac{1}{2}\left(x^{(2)} - x^{\hat{(2)}}\right)^T C^{(2)^{-1}}\left(x^{(2)} - x^{\hat{(2)}}\right) + \sum_{k=1}^{N}\left(\min\left(\frac{1}{2}\left(\pm\Delta x_k - x^{\hat{(1)}}_k + x^{\hat{(2)}}_k\right)^T c_i\left(\pm\Delta x_k - x^{\hat{(1)}}_k + x^{\hat{(2)}}_k\right)\right)\right) + \text{const}$$

It will be appreciated that certain types of ranging measurements only measure a scalar distance between the two wells. In such operations, the ranging measurements may be given, for example, as follows:

$$l = \begin{bmatrix} l_1 \\ \vdots \\ l_n \end{bmatrix}$$

where l represents the vector of measured distances $l_k$ and where $$l_i \sim \mathcal{N}(\hat{l}_i, c_i)$$

Owing to the geometrical relationships $$\hat{l}_i = \left\| x_i^{\hat{(1)}} - x_i^{\hat{(2)}} \right\|,$$

the joint likelihood for the measurement may be expressed as follows:

$$\mathcal{L} = P\left(x^{(1)}, x^{(2)}, l \mid \Delta\hat{x}^{(1)}, \Delta\hat{x}^{(2)}\right)$$

As before, each set of measurements is independent such that:

$$\mathcal{L} = P\left(x^{(1)} | x^{\hat{(1)}}\right) P\left(x^{(2)} | x^{\hat{(2)}}\right) P\left(l | x^{\hat{(1)}}, x^{\hat{(2)}}\right)$$

$$\ln \mathcal{L} = \ln P\left(x^{(1)} | x^{\hat{(1)}}\right) + \ln P\left(x^{(2)} | x^{\hat{(2)}}\right) + \ln P\left(\Delta x | x^{\hat{(1)}}, x^{\hat{(2)}}\right)$$

Assuming that the measurements follow a Gaussian distribution, the foregoing may be defined as follows and may be further optimized using any numerical method (such as those listed above):

$$L = -\ln \mathcal{L} = \frac{1}{2}\left(x^{(1)} - x^{\hat{(1)}}\right)^T C^{(1)^{-1}}\left(x^{(1)} - x^{\hat{(1)}}\right) + \frac{1}{2}\left(x^{(2)} - x^{\hat{(2)}}\right)^T C^{(2)^{-1}}\left(x^{(2)} - x^{\hat{(2)}}\right) + \sum_{k=1}^{N}\left(\frac{1}{2} c_i^{-1}\left(l_k - \left|x_k^{\hat{(1)}} - x_k^{\hat{(2)}}\right|\right)^2\right) + const$$

As described above with respect to FIG. 4B, the disclosed embodiments may make use of multiple ranging measurements such as magnetic ranging measurements, acoustic ranging measurements, and/or resistivity based ranging measurements. These multiple ranging measurements may be joined, for example, as follows:

$$\mathcal{L} = P\left(x^{(1)}, x^{(2)}, \Delta x_a, \Delta x_b, l_c | x^{\hat{(1)}}, x^{\hat{(2)}}\right)$$

In the following, three independent sets of ranging measurements are assumed $\Delta x_a$, $\Delta x_b$, and $\Delta x_c$. The disclosed embodiments are of course not limited in these regards and may make use of substantially any suitable number of sets of ranging measurements. Recognizing that each set of measurements is independent, and taking the logarithm of the joint likelihood, yields the following expression:

$$\ln \mathcal{L} = \ln P\left(x^{(1)} | x^{\hat{(1)}}\right) + \ln P\left(x^{(2)} | x^{\hat{(2)}}\right) + \ln P\left(\Delta x_a | x^{\hat{(1)}}, x^{\hat{(2)}}\right) + \ln P\left(\Delta x_b | x^{\hat{(1)}}, x^{\hat{(2)}}\right) + \ln P\left(l_c | x^{\hat{(1)}}, x^{\hat{(2)}}\right)$$

which, assuming that the measurements follow a Gaussian distribution, yields the following (which may be optimizing using substantially any suitable numerical method as described above):

$$L = -\ln \mathcal{L} = \frac{1}{2}\left(x^{(1)} - x^{\hat{(1)}}\right)^T C^{(1)^{-1}}\left(x^{(1)} - x^{\hat{(1)}}\right) + \frac{1}{2}\left(x^{(2)} - x^{\hat{(2)}}\right)^T C^{(2)^{-1}}\left(x^{(2)} - x^{\hat{(2)}}\right) +$$

-continued $$\sum_{k=1}^{N}\left(\frac{1}{2}\left(\Delta x_{a,k} - x_k^{\hat{(1)}} + x_k^{\hat{(2)}}\right)^T c_{a,i}\left(\Delta x_{a,k} - x_k^{\hat{(1)}} + x_k^{\hat{(2)}}\right)\right) + \sum_{k=1}^{N}\left(\frac{1}{2}\left(\Delta x_{b,k} - x_k^{\hat{(1)}} + x_k^{\hat{(2)}}\right)^T c_{b,i}\left(\Delta x_{b,k} - x_k^{\hat{(1)}} + x_k^{\hat{(2)}}\right)\right) + \sum_{k=1}^{N}\left(\frac{1}{2} c_{c,i}^{-1}\left(l_{c,k} - \left|x_k^{\hat{(1)}} - x_k^{\hat{(2)}}\right|\right)^2\right) + const$$

Optimizing the likelihood function to compute the most likely wellbore trajectories then advantageously enables a revised (and reduced) uncertainty of the wellbore trajectories to be computed. In example embodiments, the covariance of the wellbore trajectories after optimization may be computed from the Jacobian of the likelihood function. For example, a parameter vector $\theta$ may be defined as follows:

$$\theta = \begin{bmatrix} x^{\hat{(1)}} \\ x^{\hat{(2)}} \end{bmatrix}$$

where $\widehat{x^{(1)}}$ and $\widehat{x^{(2)}}$ are as defined above. The Jacobian $J(\theta)$ of the likelihood function may then be defined as follows:

$$J(\theta) = \begin{pmatrix} \frac{\partial L}{\partial \theta_1} \\ \frac{\partial L}{\partial \theta_2} \\ \vdots \\ \frac{\partial L}{\partial \theta_N} \end{pmatrix}$$

where L represents the likelihood function as described above. After optimization of the parameters and determination of the revised wellbore trajectories $\widehat{x^{(1)}}$ and $\widehat{x^{(2)}}$ the covariance of the estimated parameters $Cov(\hat{\theta})$ may be approximated, for example, as follows:

$$Cov(\hat{\theta}) \sim \left(J(\theta)^T J(\theta)\right)^{-1}$$

where $Cov(\hat{\theta})$ includes the covariance matrices of $\widehat{x^{(1)}}$ and $\widehat{x^{(2)}}$, namely $C^{(1)}$ and $C^{(2)}$ given above that define the covariance (or uncertainties) in the revised wellbore trajectories. It will be appreciated that a ranging uncertainty (a relative position uncertainty) is also of importance to a driller (and may be more important in certain drilling operations such as well intercept, well avoidance, or well twinning operations). As described above, ranging measurements measure the relative position between first and second wellbores. One aspect of the disclosed embodiments was the realization that a revised (improved) uncertainty in the relative position can be computed from the covariance (uncertainties) of the revised wellbore trajectories. The positional uncertainties w of first and second wellbore trajectories may be given as follows:

$$\begin{pmatrix} x_1 \\ x_2 \end{pmatrix} = \begin{pmatrix} \hat{x_1} \\ x_2 \end{pmatrix} + \omega$$

where $$\begin{pmatrix} x_1 \\ x_2 \end{pmatrix}$$

represent the measured trajectories, $$\begin{pmatrix} \hat{x}_1 \\ x_2 \end{pmatrix}$$

represent the actual trajectories of the revised (optimized) trajectories determined as described above, and ω represents the positional uncertainty as given below:

$$\omega \sim \mathcal{N}(0, C)$$

where $\mathcal{N}$ (0, C) indicates a normal distribution with zero mean, and C represents the covariance, for example as follows:

$$C = \begin{bmatrix} C_{x_1} & C_{x_1,x_2} \\ C_{x_2,x_1} & C_{x_2} \end{bmatrix}$$

where $C_{x_1}$ represents the covariance matrix of the first wellbore, $C_{x_2}$ represents the covariance matrix of the second wellbore, and $C_{x_1,x_2}$ and $C_{x_2,x_1}$ represent correlated covariance matrices where $C_{x_1,x_2}=C_{x_2,x_1}=0$ for independent measurements (having no correlation with one another). For example, in the absence of ranging measurements, independently measured wellbore trajectories generally have correlated covariance matrices equal to zero. However, the ranging measurements provide a correlation between the wellbore trajectories such that $C_{x_1,x_2}$, $C_{x_2,x_1} \neq 0$.

The covariance matrices C may be given by the survey and ranging error models or from the ranging fusion. The relative position between the wellbore trajectories may be given as follows:

$$x = x_1 - x_2$$

The error (or uncertainty or covariance) of the relative position, and therefore the covariance of the ranging measurements, may be expressed, for example, as follows:

$$\begin{aligned} C(\Delta x) &= E\left((\Delta x_1 - \Delta x_2)(\Delta x_1 - \Delta x_2)^T\right) \\ &= E\left(\Delta x_1 \Delta x_1^T - \Delta x_1 \Delta x_2^T - \Delta x_2 \Delta x_1^T + \Delta x_2 \Delta x_2^T\right) \\ &= C_{x_1} - C_{x_1,x_2} - C_{x_2,x_1} + C_{x_2} \end{aligned}$$

where C(Δx) represents the covariance of the ranging measurements, E(•) represents an error model, and $\Delta x_1$ and $\Delta x_2$ represent a positional estimation error for $x_1$ and $x_2$. Note that the covariance of the ranging measurements C(Δx) may be computed directly from the covariance matrices C.

The disclosed embodiments are described in further detail below with respect to the following nonlimiting example. It will be appreciated that the disclosed embodiments are not limited or restricted in any way by this example.

Figure 5A:
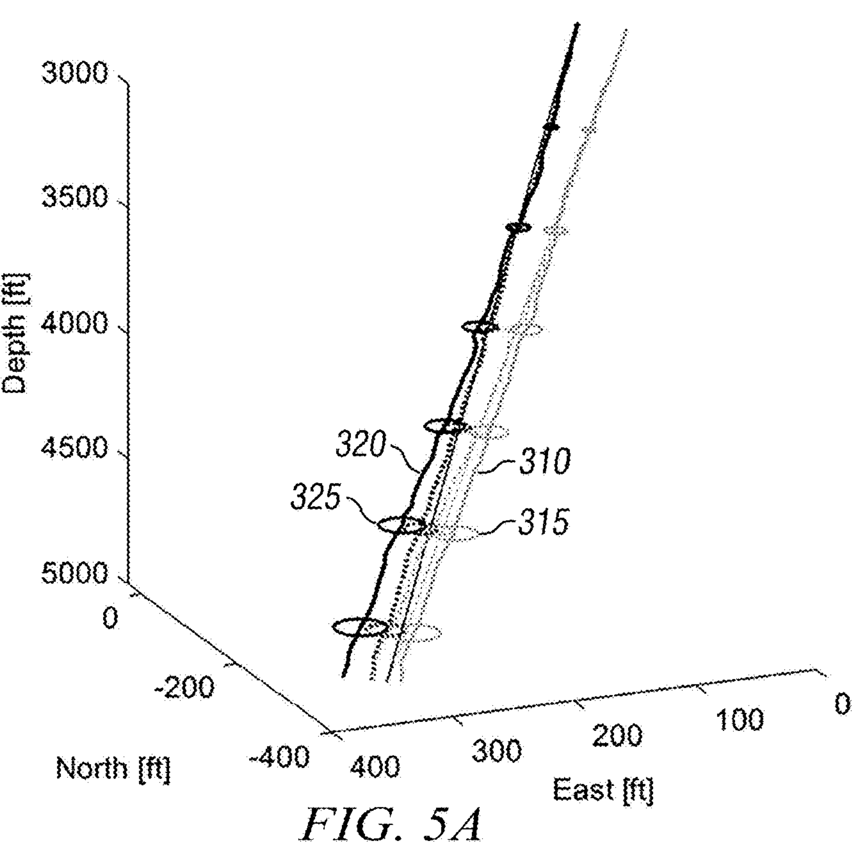
Figure 5B:
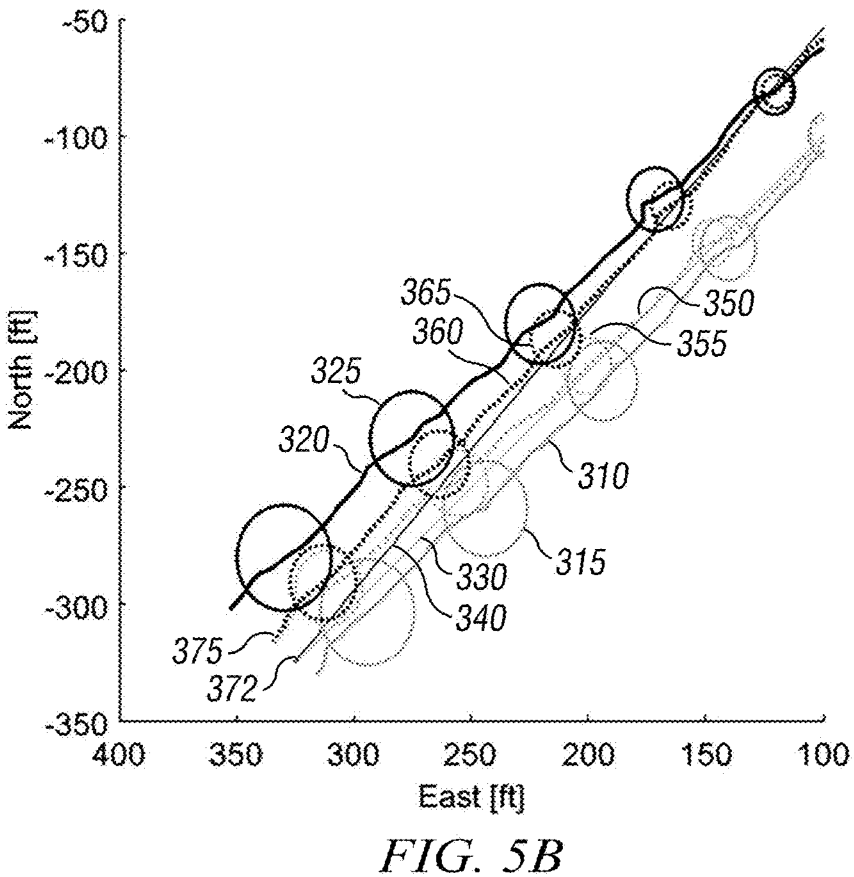
Figure 5C:
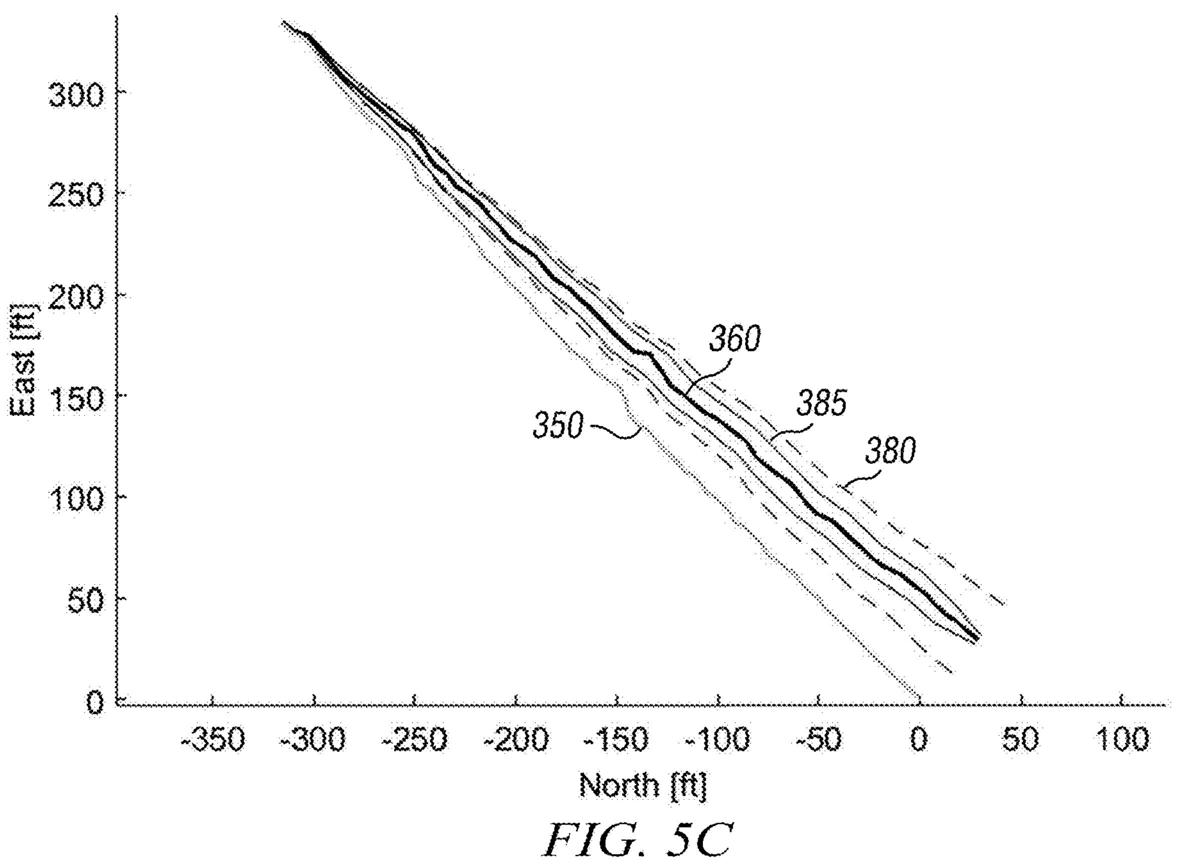
Figure 5D:
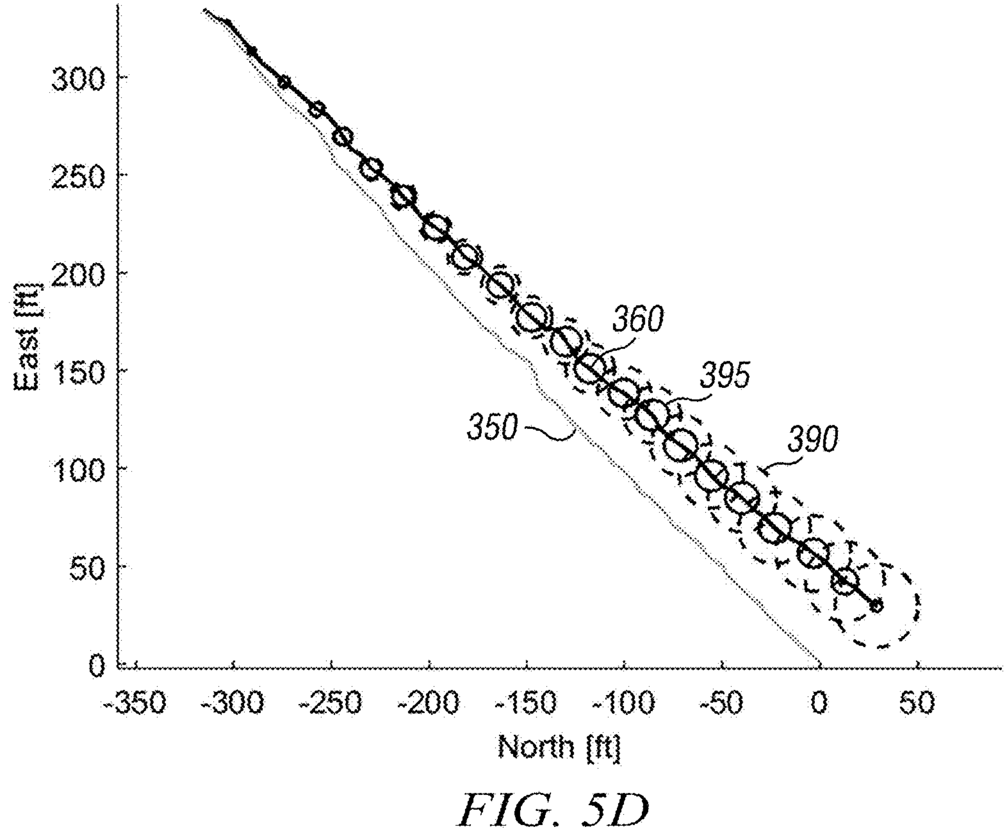

FIGS. 5A, 5B, 5C, and 5D (collectively FIG. 5) depict example first and second wellbore trajectories that illustrate the disclosed embodiments in which FIG. 5A depicts an isometric (or path) view and FIGS. 5B, 5C, and 5D depict well plans (or horizontal profiles) of the wellbore trajectories. An example wellbore intercept operation is depicted in which the second wellbore intercepts the first wellbore and in which ranging measurements were made in the second wellbore. Drilling proceeded from upper right to lower left in the figure. The surveyed (measured) trajectories are shown as solid thick grey (wellbore 1) and black (wellbore 2) lines at 310 and 320 with corresponding ellipses of uncertainty at 315 and 325. The true trajectories are shown as solid thin grey (wellbore 1) and black (wellbore 2) lines at 330 and 340. The revised trajectories (based on the disclosed ranging fusion methods) are shown as dashed grey (wellbore 1) and black (wellbore 2) lines at 350 and 360. In the depicted example, the true trajectories 330 and 340 show an intercept at 372, which is also observed in the revised (improved) trajectories at 375.

In FIGS. 5A and 5B, the solid grey (wellbore 1) and black (wellbore 2) circles 315, 325 represent the positional uncertainties of the as-measured (surveyed) trajectories. The dashed grey (wellbore 1) and black (wellbore 2) circles 355, 365 represent the improved positional uncertainties of the revised trajectories 350, 360. Note that the positional uncertainty of the revised trajectory is about half of that of the original as-measured trajectories. The positional uncertainties of the as-measured trajectories were derived from survey error models and increases with increasing measured depth as described above. The improved positional uncertainties of the revised trajectories were determined as described above and assumed a 10 percent distance uncertainty in the ranging measurements.

In FIGS. 5C and 5D, ranging uncertainties are shown about the revised trajectory 360 of the second wellbore. FIG. 5C depicts a Christmas Tree plot including rectangular shape uncertainty bands. The original uncertainties are shown as dashed grey lines at 380 while the revised (improved) uncertainties are shown as solid grey lines at 385. In FIG. 5D, the original ranging uncertainties are shown as the outer dashed circles 390 about the second trajectory 360 while the revised ranging uncertainties 395 are shown as the inner solid circles (based upon ellipses of uncertainty). Note that the disclosed embodiments advantageously significantly reduce the ranging uncertainties, particularly when the distance between the two wells is significant and the original ranging uncertainty is large. The disclosed embodiments may therefore advantageously improve wellbore intercept, avoidance, and twinning operations by providing enhanced ranging certainty particularly at larger ranging distances.

Figure 6:
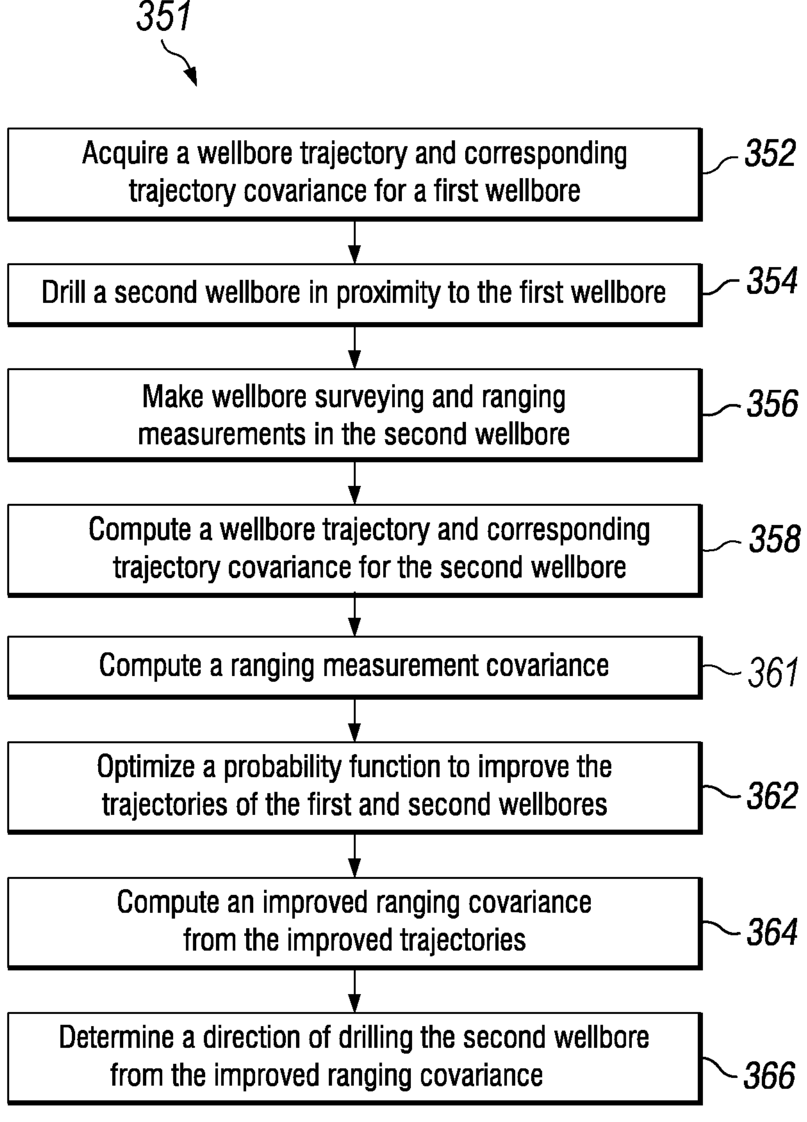
FIG. 6 depicts a flow chart of a disclosed method for drilling one wellbore in proximity to another.

FIG. 6 depicts a flow chart of a disclosed method 351 for drilling a second wellbore in proximity to a first wellbore (e.g., with sensory range of ranging measurements). The method 351 includes receiving (or computing) a wellbore trajectory and corresponding trajectory covariance at 352 for a first wellbore based on survey measurements made during or after drilling the first wellbore and a survey measurement error model. The second wellbore is drilled in proximity to the first wellbore (e.g., via a conventional rotary drilling techniques) at 354. Wellbore surveying and ranging measurements are made in the second wellbore while drilling at 356. The surveying and ranging measurements may include substantially any suitable surveying and ranging measurements known to those of ordinary skill in the art. A trajectory and a corresponding trajectory covariance of the second wellbore may be computed from the wellbore surveying measurements and a corresponding survey measurement error model at 358. A ranging measurement covariance may be computed at 361 from a ranging measurement error model. A probability function such as a likelihood function may be optimized (e.g., as described above) to compute improved trajectories for the first and second wellbores at 362. An improved ranging covariance (or positional uncertainty) may be optionally computed at 364 from the improved trajectories of the first and second wellbores. A new direction (or a change in direction) of drilling of the second wellbore may be determined from the improved positional uncertainty of the ranging measurements at 366.

It will be appreciated that method 351 may advantageously improve drilling operations that employ ranging measurements, such as wellbore intercept, wellbore avoidance, and wellbore twinning operations. For example, in wellbore intercept operations the improved certainty of the ranging measurements may enable the intercept to be more quickly achieved. In wellbore avoidance operations, the improved certainty of the ranging measurements may enable the driller to more confidently avoid the first wellbore and to more quickly determine new drilling directions. In wellbore twinning operations, the improved certainty of the ranging measurements may enable more precise wellbore twins to be drilled.

Although fusion of wellbore surveys and ranging measurements and certain advantages thereof have been described in detail, it should be understood that various changes, substitutions and alterations may be made herein without departing from the spirit and scope of the disclosure.

The invention claimed is:

1. A method for combining wellbore surveying measurements and ranging measurements to obtain an improved wellbore trajectory, the method comprising:

obtaining first and second wellbore trajectories for first and second corresponding wellbores and first and second positional uncertainties for the first and second wellbore trajectories;

obtaining a set of ranging measurements and a corresponding ranging uncertainty, the ranging measurements including at least a distance between the first and second wellbores, the ranging measurements made using a bottom hole assembly (BHA) deployed in the second wellbore;

defining a probability function including the first and second wellbore trajectories, the first and second positional uncertainties, the ranging measurements, and the ranging uncertainty, the probability function determining a probability of observing the obtained first and second wellbore trajectories and the obtained ranging measurements for various actual first and second wellbore trajectories;

optimizing the probability function to compute an improved wellbore trajectory of at least one of the first and second wellbores, the improved wellbore trajectory having an improved positional uncertainty;

determining a direction of drilling the second wellbore from the improved wellbore trajectory of the at least one of the first and second wellbores; and causing a BHA to drill the second wellbore in the determined direction of drilling.

2. The method of claim 1, wherein:

the first and second wellbore trajectories are computed from first and second corresponding sets of wellbore survey measurements; and the first and second positional uncertainties comprise first and second covariance matrices that are computed from corresponding error models for the first and second sets of wellbore survey measurements.

3. The method of claim 1, wherein the ranging uncertainty is a ranging covariance computed from a ranging error model.

4. The method of claim 1, wherein the probability function comprises a likelihood function and optimizing the probability function comprises selecting the actual first and second wellbore trajectories that are most likely based on the likelihood function.

5. The method of claim 4, wherein the defined likelihood function comprises a joint likelihood including a product of first, second, and third independent probabilities, the first probability being a probability of observing the obtained first wellbore trajectory for the various actual first wellbore trajectories, the second probability being a probability of observing the obtained second wellbore trajectory for the various actual second wellbore trajectories, and the third probability being a probability of observing the obtained ranging measurements for the various actual first and second wellbore trajectories.

6. The method of claim 1, wherein the ranging measurements comprise a vector quantity including the distance and a direction between the first and second wellbores.

7. The method of claim 1, wherein the ranging measurements comprise a plurality of unique sets of ranging measurements and corresponding ranging uncertainties, the unique sets of ranging measurements made using corresponding distinct ranging measurement techniques.

8. The method of claim 1, further comprising computing an improved ranging uncertainty from the improved wellbore trajectory of the at least one of the first and second wellbores obtained in the optimizing.

9. The method of claim 8, further comprising displaying a plot of the improved wellbore trajectory of the at least one of the first and second wellbores and at least one of the improved positional uncertainties or the improved ranging uncertainty.

10. The method of claim 1, wherein the determining a direction of drilling the second wellbore further comprises computing an improved ranging uncertainty from the improved wellbore trajectory of the at least one of the first and second wellbores obtained in the optimizing and determining the direction of drilling from the ranging measurements and the improved ranging uncertainty.

11. A system for combining wellbore surveying measurements and ranging measurements to obtain an improved wellbore trajectory, comprising:

one or more processors;

memory, accessible by the one or more processors, and storing instructions that, when executed by the one or more processors, cause the one or more processors to perform operations comprising:

receiving first and second wellbore trajectories for first and second corresponding wellbores and first and second positional uncertainties for the first and second wellbore trajectories;

receiving a set of ranging measurements and a corresponding ranging uncertainty, the ranging measurements including at least a distance between the first and second wellbores;

optimizing a probability function to compute the improved wellbore trajectory of at least one of the first and second wellbores, the probability function including the first and second wellbore trajectories, the first and second positional uncertainties, the ranging measurements, and the ranging uncertainty, the probability function determining a probability of observing the received first and second wellbore trajectories and the received ranging measurements for various actual first and second wellbore trajectories; and determining a direction of drilling the second wellbore from the improved wellbore trajectory of the at least one of the first and second wellbores; and a bottom hole assembly (BHA) configured for deployment in the second wellbore on a drill string, the BHA configured to make the set of ranging measurements in the second wellbore, the BHA still further configured to receive the determined direction of drilling from the one or more processors and to drill the second wellbore along the determined direction of drilling.

12. The system of claim 11, wherein the BHA is yet further configured to make survey measurements from which the second wellbore trajectory is computed.

13. The system of claim 11, wherein the determining a direction of drilling the second wellbore further comprises:

computing an improved ranging uncertainty from the improved wellbore trajectory of the at least one of the first and second wellbores obtained in the optimizing; and determining the direction of drilling the second wellbore from the ranging measurements and the improved ranging uncertainty.

14. The system of claim 11, wherein the probability function comprises a likelihood function and optimizing the probability function comprises selecting the actual first and second wellbore trajectories that are most likely based on the likelihood function.

15. The system of claim 14, wherein the likelihood function comprises a joint likelihood including a product of first, second, and third independent probabilities, the first probability being a probability of observing the obtained first wellbore trajectory for the various actual first wellbore trajectories, the second probability being a probability of observing the obtained second wellbore trajectory for the various actual second wellbore trajectories, and the third probability being a probability of observing the obtained ranging measurements for the various actual first and second wellbore trajectories.

16. A method for drilling a subterranean wellbore, the method comprising:

obtaining a first wellbore trajectory and corresponding first positional uncertainties for a first wellbore;

drilling a second wellbore in proximity to the first wellbore using a bottom hole assembly (BHA) deployed in the second wellbore;

making wellbore surveying measurements and ranging measurements in the second wellbore using the BHA, the ranging measurements measuring at least a distance between the first wellbore and the second wellbore;

computing a second wellbore trajectory and corresponding second positional uncertainties for the second wellbore;

computing a ranging uncertainty;

defining a probability function including the first and second wellbore trajectories, the first and second positional uncertainties, the ranging measurements, and the ranging uncertainty, the probability function determining a probability of observing the obtained first and second wellbore trajectories and the obtained ranging measurements for various actual first and second wellbore trajectories;

optimizing the probability function to compute an improved wellbore trajectory of at least one of the first and second wellbores;

computing an improved ranging uncertainty from the improved wellbore trajectory of the at least one of the first and second wellbores obtained in the optimizing;

determining a direction of drilling or a change in the direction of drilling of the second wellbore from the ranging measurements and the improved ranging uncertainty; and using the BHA to drill the second wellbore in the determined direction of drilling.

17. The method of claim 16, wherein the probability function comprises a likelihood function and optimizing the probability function comprises selecting the actual first and second wellbore trajectories that are most likely based on the likelihood function.

18. The method of claim 17, wherein the defined likelihood function comprises a joint likelihood including a product of first, second, and third independent probabilities, the first probability being a probability of observing the obtained first wellbore trajectory for the various actual first wellbore trajectories, the second probability being a probability of observing the obtained second wellbore trajectory for the various actual second wellbore trajectories, and the third probability being a probability of observing the obtained ranging measurements for the various actual first and second wellbore trajectories.

19. The method of claim 16, wherein the ranging measurements comprise a vector quantity including the distance and a direction between the first and second wellbores.

20. The method of claim 16, wherein the computing an improved ranging uncertainty comprises computing a refined covariance.

* * * * *